United States Patent
Brisighella, Jr. et al.

(10) Patent No.: US 9,290,419 B2
(45) Date of Patent: *Mar. 22, 2016

(54) DUPLEX ACTUATION SYSTEM FOR INFLATABLE RESTRAINTS

(71) Applicant: Autoliv ASP, Inc., Ogden, UT (US)

(72) Inventors: Dario G. Brisighella, Jr., North Logan, UT (US); Scott C. Gordon, Hyde Park, UT (US); Vincent Colarossi, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 642 days.

This patent is subject to a terminal disclaimer.

(21) Appl. No.: 13/688,839

(22) Filed: Nov. 29, 2012

(65) Prior Publication Data
US 2014/0144344 A1    May 29, 2014

(51) Int. Cl.
| | |
|---|---|
| B60L 1/00 | (2006.01) |
| C06D 5/00 | (2006.01) |
| F42B 3/12 | (2006.01) |
| B60R 21/017 | (2006.01) |

(52) U.S. Cl.
CPC . *C06D 5/00* (2013.01); *F42B 3/121* (2013.01); *B60R 21/017* (2013.01)

(58) Field of Classification Search
CPC .................................................. Y02T 10/7005
USPC .......................................................... 307/9.1
See application file for complete search history.

(56) References Cited

U.S. PATENT DOCUMENTS

| | | |
|---|---|---|
| 3,225,695 A | 12/1965 | Kapp et al. |
| 4,998,751 A | 3/1991 | Paxton et al. |
| 5,179,248 A | 1/1993 | Hartman et al. |
| 5,309,841 A | 5/1994 | Hartman et al. |
| 5,603,525 A | 2/1997 | Zakula |
| 5,668,528 A | 9/1997 | Kitao et al. |
| 6,032,979 A | 3/2000 | Mossi et al. |
| 6,068,291 A | 5/2000 | Lebaudy et al. |
| 6,079,739 A | 6/2000 | Perotto et al. |
| 6,131,947 A | 10/2000 | Mramor et al. |
| 6,145,877 A | 11/2000 | Rink et al. |
| 6,155,171 A | 12/2000 | Haegeman et al. |
| 6,189,924 B1 | 2/2001 | Hock |
| 6,189,927 B1 | 2/2001 | Mossi et al. |
| 6,295,935 B1 | 10/2001 | Swann et al. |
| 6,398,590 B2 * | 6/2002 | Banas ................ H01R 24/58 439/395 |
| 6,508,175 B1 | 1/2003 | Avetisian |
| 6,547,275 B2 | 4/2003 | Nakashima et al. |
| 6,571,712 B2 | 6/2003 | Perotto et al. |
| 6,722,694 B1 | 4/2004 | Nakashima et al. |
| 7,004,500 B2 | 2/2006 | Dinsdale et al. |

(Continued)

OTHER PUBLICATIONS

Co-pending U.S. Appl. No. 13/688,893, filed Nov. 29, 2012; Inventors Bradley W. Smith et al.; title: Duplex Firing Inflator.

(Continued)

*Primary Examiner* — Stephen W Jackson
(74) *Attorney, Agent, or Firm* — Pauley Erickson & Kottis

(57) ABSTRACT

A duplex firing initiator for an airbag inflator includes both a primary initiator and a secondary initiator for electrical connection to a Restraint Control Module. In the duplex firing initiator, current is conducted in a forward polarity through the primary initiator to actuate the primary initiator and current is conducted in a reverse polarity through the secondary initiator to actuate at least the secondary initiator.

17 Claims, 10 Drawing Sheets

(56) References Cited

U.S. PATENT DOCUMENTS

| | | | |
|---|---|---|---|
| 7,150,227 B2 | 12/2006 | Matsuda | |
| 7,263,929 B2 | 9/2007 | Takahara | |
| 7,347,448 B2 | 3/2008 | Smith et al. | |
| 7,374,204 B2 | 5/2008 | Hoffman et al. | |
| 7,597,353 B2 | 10/2009 | Smith et al. | |
| 7,726,687 B2 | 6/2010 | Hoffman et al. | |
| 7,950,693 B2 | 5/2011 | Jackson et al. | |
| 8,676,448 B2 * | 3/2014 | Ooyabu | B60R 21/013 102/202.1 |
| 8,986,046 B2 * | 3/2015 | Smith | H01R 13/6658 439/620.22 |
| 2002/0050703 A1 | 5/2002 | Whang et al. | |
| 2002/0056976 A1 | 5/2002 | Nakashima et al. | |
| 2003/0184068 A1 | 10/2003 | Nakashima et al. | |
| 2004/0083919 A1 | 5/2004 | Hosey et al. | |
| 2004/0232679 A1 | 11/2004 | Kubo et al. | |
| 2005/0200203 A1 | 9/2005 | Uono et al. | |
| 2005/0206145 A1 | 9/2005 | Kato et al. | |
| 2005/0250350 A1 | 11/2005 | Nakashima et al. | |
| 2006/0000948 A1 | 1/2006 | Ooyabu | |
| 2007/0075535 A1 | 4/2007 | Trevillyan et al. | |
| 2008/0211215 A1 | 9/2008 | Hoffman et al. | |

OTHER PUBLICATIONS

Co-pending U.S. Appl. No. 13/688,895; filed Nov. 29, 2012; inventor Eiswerth; title: Method and System for Diagnostic Measurement of Motor Vehicle Restraint System Squib Loop Resistance.

Co-Pending U.S. Appl. No. 13/688,917; filed Nov. 29, 2012; inventor Smith; title: Electrical Harness Assembly for Duplex Activation for Motor Vehicle Restraint Systems.

Co-pending Patent Application, filed Nov. 29, 2012; Inventors Bradley W. Smith et al.; title: Duplex Firing Inflator.

* cited by examiner

DUPLEX ACTUATION SYSTEM FOR INFLATABLE RESTRAINTS

BACKGROUND OF THE INVENTION

This invention relates generally to inflatable restraint systems and, more particularly, to actuation systems such as for use in the inflation of inflatable devices such as inflatable vehicle occupant restraint airbag cushions used in inflatable restraint systems.

Inflatable safety restraint installations typically employ an inflator device to produce inflation gas for inflating a vehicle occupant restraint airbag cushion in the event of a collision. Such inflator devices often include a gas generant material stored within an inflator device housing and an initiator in combination with the housing that actuates the gas generant material. The initiator typically includes a reactive charge in combination with electrical connectors. A signal sent through the electrical connector(s) actuates the reactive charge, which produces reaction products that actuate the gas generant material.

In view of possibly varying operating conditions and, in turn, possibly varying desired performance characteristics, inflatable safety restraint technology has lead to the development of what has been termed "adaptive" or "Smart" inflator devices and corresponding inflatable restraint systems. With an adaptive inflator device, output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Pyrotechnic inflators typically may have one or more chambers containing gas generant. Adaptive pyrotechnic inflators having gas generant material in two chambers, which are independently ignited via respective initiators or igniters have been referred to as "dual stage" inflators. In practice, each such gas generant material-containing chamber is oftentimes referred to as a "combustion chamber" as the gas generant material therein contained is burned or otherwise reacted to produce or form gas such as may be used to inflate an associated inflatable restraint airbag cushion.

Dual stage inflators may have several contemplated actuation or firing scenarios. In a first such scenario, only the gas generant material in a first or primary chamber and associate initiator device is actuated whereby a fixed quantity of inflation gas is produced thereby. In a second possible scenario, the first or primary initiator is first actuated whereby gas generant material in a first chamber is first reacted to start to produce or form inflation gas and after a predetermined or preselected delay, a secondary initiator is then actuated whereby gas generant material in the second chamber is reacted to also produce or form inflation gas. In a third possible scenario, both the primary and the secondary initiators are actuated whereby a gas generant material in a first chamber and a gas generant material in a second chamber are actuated simultaneously to produce or form inflation gas from the gas generant material in each of the chambers.

As will be appreciated, through the selection and use of an appropriate such actuation or firing scenario, inflator output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Current "Smart" systems, employing two stages, or Dual Stage systems for airbag inflators commonly utilize two separate initiator assemblies. In the current state of automotive airbag technology, dedicated wiring is commonly employed to direct safety device function signals from a Restraint Control Module (RCM) to each device being commanded to deploy. Further, each individual initiator assembly is typically either injection molded or crimped into a respective supporting adapter. Each initiator assembly typically will include or have dedicated pins and associated connectors that direct the operating current to the respective initiator. Thus, the evolution of the technology to "Smart" systems, employing two stages, or Dual Stage systems for airbag inflators, has lead to an increase in the number of individual actuation or firing loops, connectors, output pins and RCM connectors required for providing or resulting in the desired range of operation for a particular inflatable restraint system. As a result, such Dual Stage systems are typically larger in packaging size, heavier in weight and more complex in operation, than may otherwise be desired.

Thus, there is a need and demand for Dual Stage systems and component(s) thereof and associated methods of operation of increased simplicity and reliability of operation and design. In particular, there is a need and demand for Dual Stage systems and component(s) thereof and associated methods of operation that provide or result in specifically desired inflation performance scenarios in a less costly and/or more efficient manner (e.g., one or more of reduced size, weight and/or complexity of operation).

SUMMARY OF THE INVENTION

The present invention provides an improved actuation system, particularly an improved duplex actuation system such as for use in the inflation of inflatable devices such as inflatable vehicle occupant restraint airbag cushions used in inflatable restraint systems.

In accordance with one aspect, there is provided a duplex firing initiator for an airbag inflator. The duplex firing initiator includes both a primary initiator and a secondary initiator for electrical connection to a Restraint Control Module (RCM). With the duplex firing initiator, current is conducted in a forward polarity through the primary initiator to actuate the primary initiator and current is conducted in a reverse polarity through the secondary initiator to actuate at least the secondary initiator.

According to one embodiment, a duplex firing initiator includes a diode and the secondary initiator connected in a parallel connection. The primary initiator is connected in series with the parallel connection of the diode and the secondary initiator. With such a duplex firing initiator, current is conducted in a forward polarity through the diode and the primary initiator to actuate the primary initiator and current is conducted in a reverse polarity through the primary initiator and the secondary initiator to actuate at least the secondary initiator.

According to another embodiment, a duplex firing initiator includes the primary initiator connected in series with a first diode. The duplex firing initiator also includes the secondary initiator connected in series with a second diode, with the secondary initiator and the second diode connected in parallel with the primary initiator and the first diode. In such a duplex firing initiator, the second diode is reverse biased compared to the first diode. Current is conducted in a forward polarity through the first diode to actuate or fire the primary initiator. In turn, current is conducted in a reverse polarity to actuate or fire the secondary initiator.

According yet to another embodiment, a duplex firing initiator includes the primary initiator connected in parallel to a zener diode/diode pair disposed between a first node and a second node. The zener diode/diode pair includes a zener diode connected in series with a diode. The duplex firing initiator further includes the secondary initiator connected in parallel with a second diode between the second node and a third node. With such a duplex firing initiator, current is conducted in the forward polarity from the first node to the second node to the third node and in the reverse polarity from the third node to the second node to the first node. Further, current is conducted in the forward polarity through the primary initiator and the second diode to actuate the primary initiator and in the reverse polarity through the secondary initiator and at least one of the primary initiator and the zener diode/diode pair to actuate at least the secondary initiator.

Also described are embodiments such as are specifically suited to address at least certain potential failure modes that may results from the functioning of one of the initiators. As described more fully below, such embodiments may, for example, advantageously provide a solution to a primary side post-initiation short to ground scenario, where a primary side diode isolates the ground path in order for the secondary side initiation to still occur as appropriately demanded by the RCM.

Other objects and advantages will be apparent to those skilled in the art from the following detailed description taken in conjunction with the appended claims and drawings.

DETAILED DESCRIPTION OF THE INVENTION

As described in greater detail below, the present invention provides a duplex firing initiator such as for use in the inflation of inflatable devices such as inflatable vehicle occupant restraint airbag cushions used in inflatable restraint systems.

Figure 1:
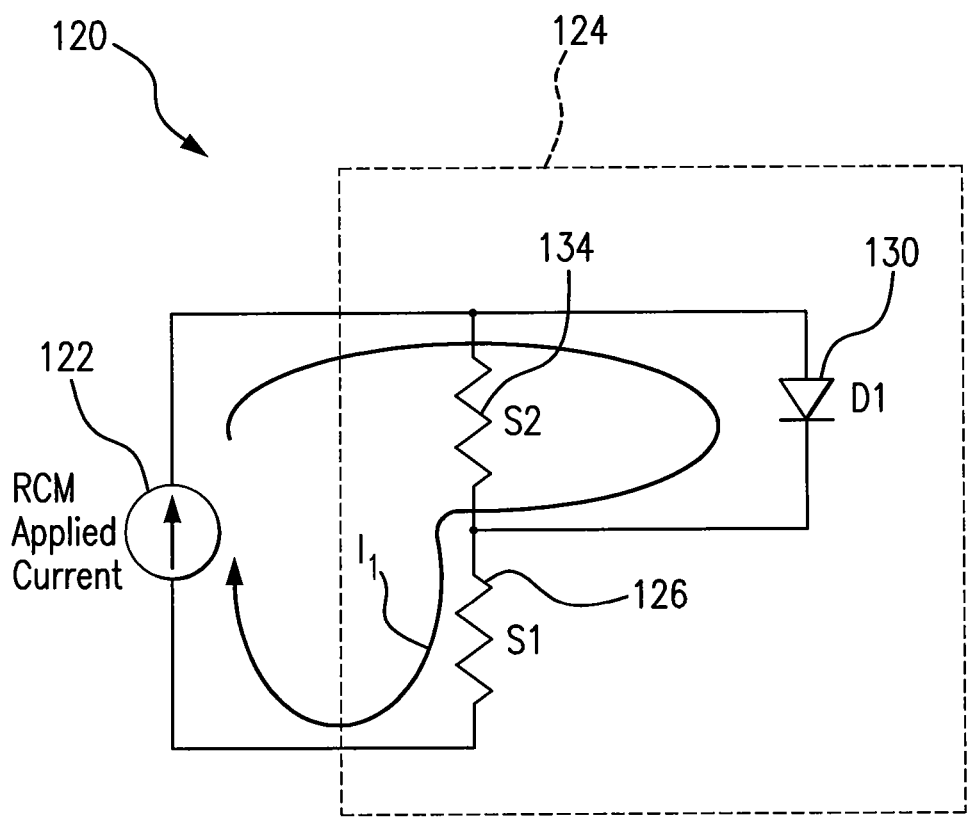
FIG. 1 is a schematic showing an actuation system including a duplex firing initiator in accordance with one in one embodiment of the invention.

FIG. 1 illustrates an actuation system in accordance with one aspect of the invention and generally designated by the reference numeral 120. The actuation system 120 includes a Restraint Control Module (RCM) 122 electrically connected to a duplex firing initiator in accordance with one aspect of the invention and generally designated by the reference numeral 124.

As described in greater detail below, the duplex firing initiator 124 includes a primary initiator 126, a diode 130 and a secondary initiator 134. The diode 130 and the secondary initiator 134 are connected in a parallel connection. The primary initiator 126 is connected in series with the parallel connection of the diode 130 and the secondary initiator 134.

In typical Dual-Stage Inflator systems, the function of the primary stage initiator is to expel heat and pressure into an adjacent inflator pyrotechnic in order to initiate the formation of inflator-produced gasses which exit the inflator and fill an associated inflatable device, e.g., airbag. The second stage initiator is utilized as dictated by the RCM as a secondary device that enhances the overall creation of inflator gasses by initiating a secondary reaction, once again such as by expelling heat and pressure into a second inflator pyrotechnic. In practice, such systems are typically configured as an 80%/20% or 70%/30% split in output performance as required by the vehicle configuration. Different vehicle crash scenarios dictate how the RCM determines the two stages should be initiated. The function of the diode(s) is to direct the current, applied by the RCM, to the primary and secondary initiators depending on the polarity of the current flow.

As shown in FIG. 1, functioning of the primary initiator 126 can be realized by directing current ($I_1$) to the primary initiator 126 through the diode 130.

Figure 2:
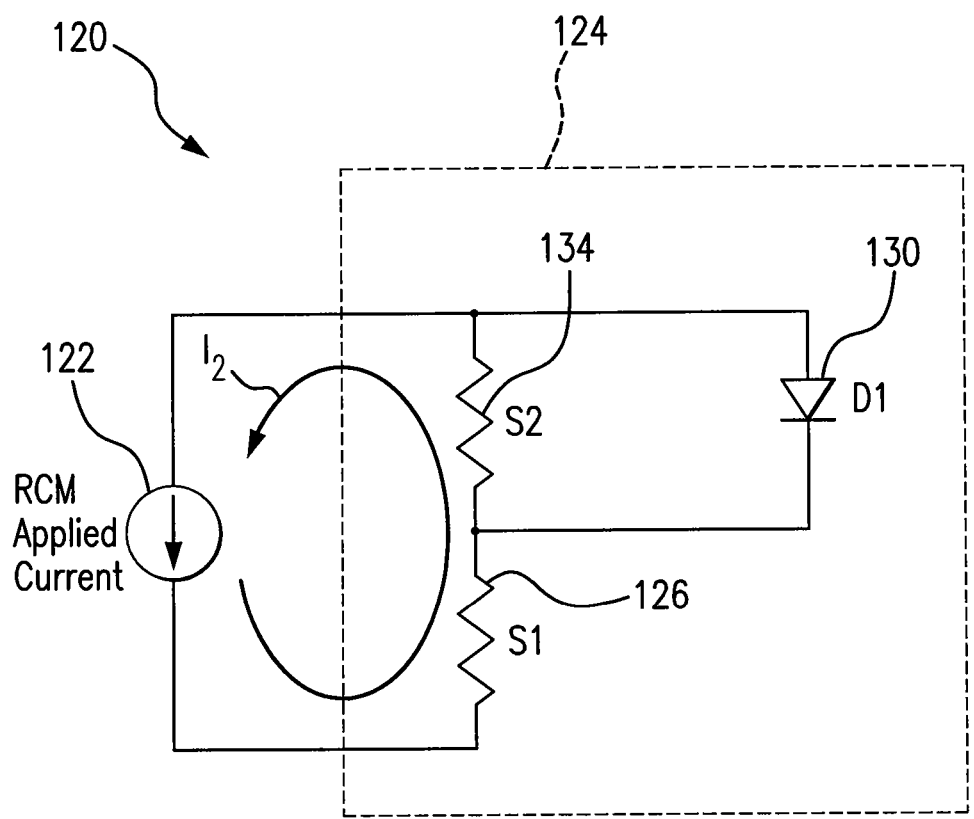
FIG. 2 is a schematic showing the actuation system shown in FIG. 1 but now with the duplex firing initiator in accordance with another aspect of the invention.

FIG. 2 illustrates the actuation system 120 but now in the event of an occurrence of a situation or event requiring a serial firing of each of the primary and secondary initiators, 126 and 134, respectively, of the duplex firing initiator 124. On the occurrence of such an event, the RCM 122 conducts current ($I_2$) in a reverse polarity through the primary initiator 126 and the secondary initiator 134 to fire at least the primary initiator 126 and, preferably, both the primary initiator 126 and the secondary initiator 134 in a serial fashion or mode.

Figure 3:
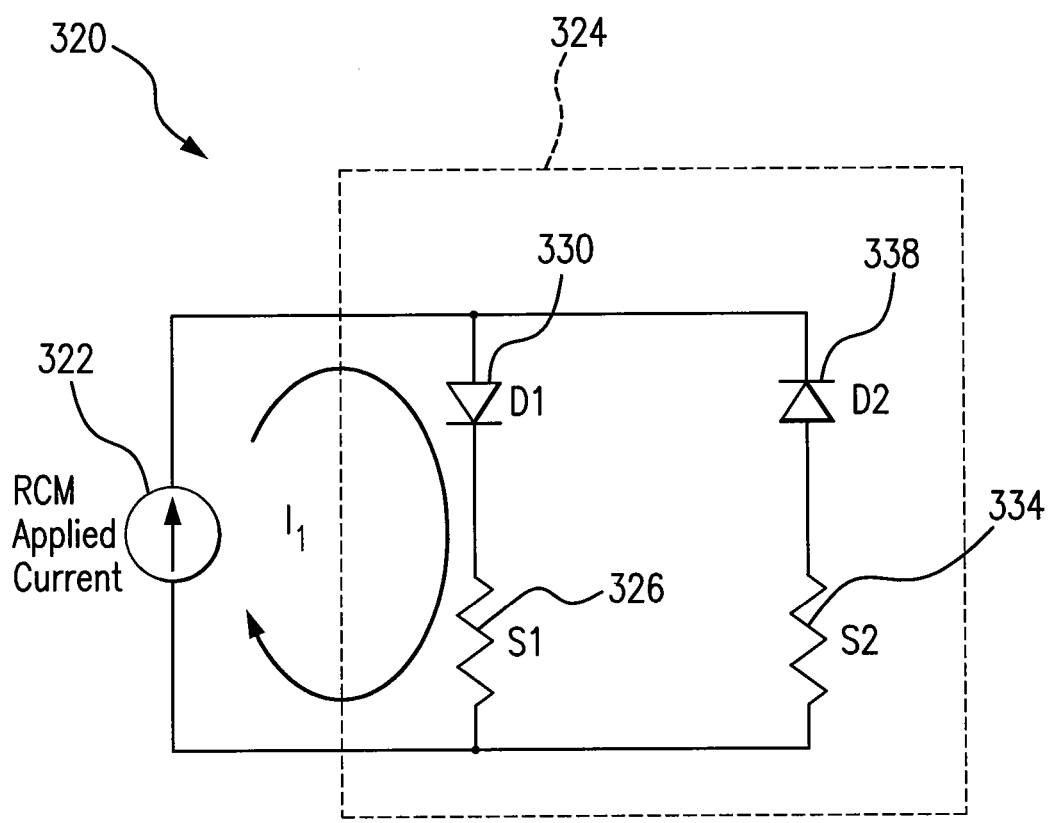
FIG. 3 is a schematic showing an actuation system including a duplex firing initiator in accordance with another embodiment of the invention.

FIG. 3 illustrates an actuation system in accordance with another embodiment of the invention and generally designated by the reference numeral 320. The actuation system 320 includes a Restraint Control Module (RCM) 322 electrically connected to a duplex firing initiator in accordance with one aspect of the invention and generally designated by the reference numeral 324.

As described in greater detail below, the duplex firing initiator 324 includes a primary initiator 326, a first diode 330, a secondary initiator 334 and a second diode 338. The primary initiator 326 is connected in series with the first diode 330. The secondary initiator 334 is similarly connected in series with the second diode 338, however, with the second diode 338 reverse biased compared to the first diode 330. Further, the secondary initiator 334 and the second diode 338 are connected in parallel with the primary initiator 326 and the first diode 330.

As shown in FIG. 3, upon the occurrence of an event calling for or requiring only actuation of the primary initiator 326, current would be applied via the RCM 322 in positive polarity. The first diode 330 is positively biased and would permit current ($I_1$) to flow through the primary initiator 326 once the diode threshold voltage is exceeded. e.g., a typical diode threshold voltage is 0.7V. The second diode 338 is reversed biased and, with such current flow, does not permit current flow to the secondary initiator 334.

Figure 4:
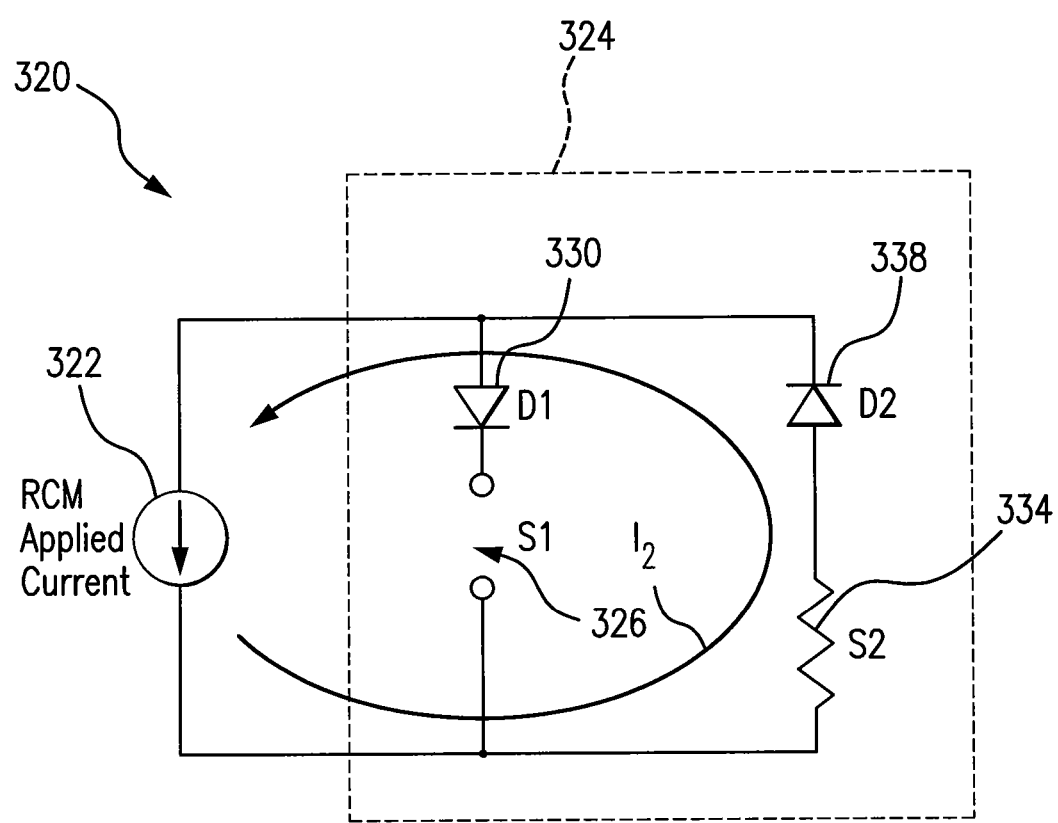
FIG. 4 is a schematic showing the actuation system shown in FIG. 3 but now with the duplex firing initiator in accordance with another aspect of the invention.

As shown in FIG. 4, once the primary initiator 326 has functioned, the primary initiator 326 typically becomes an open circuit and the secondary initiator 334 can then be actuated using a current provided by the RCM 322 in an opposite polarity. As a safeguard, if the primary initiator were to become a short circuit rather than an open circuit during deployment, the first diode 330 would not permit current flow and therefore current would still be forced to flow through the secondary initiator 334.

Figure 5:
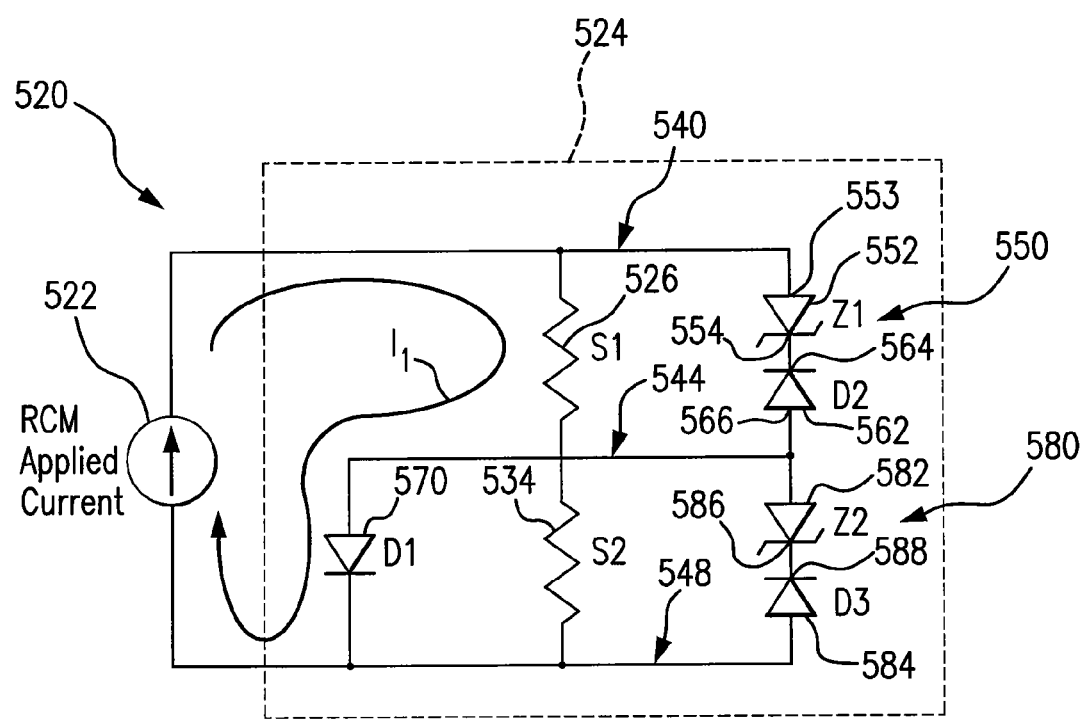
FIG. 5 is a schematic showing an actuation system including a duplex firing initiator in accordance with another embodiment of the invention.
Figure 6:
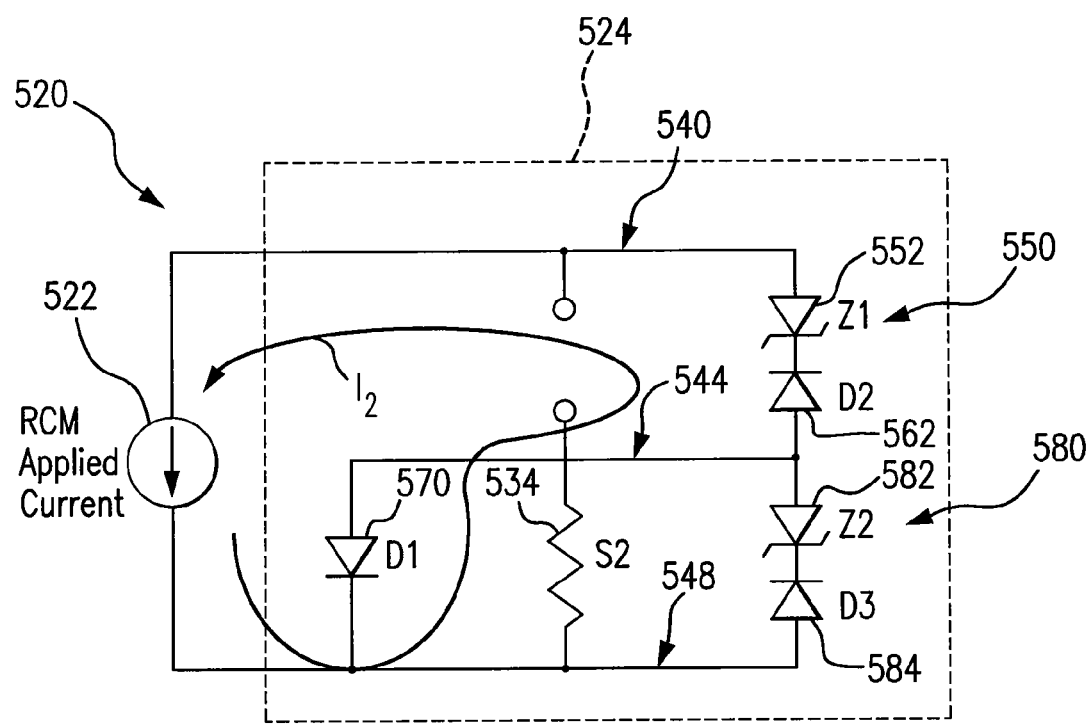
FIG. 6 is a schematic showing the actuation system shown in FIG. 5 but now with the duplex firing initiator shown in accordance with another aspect of the invention.
Figure 7:
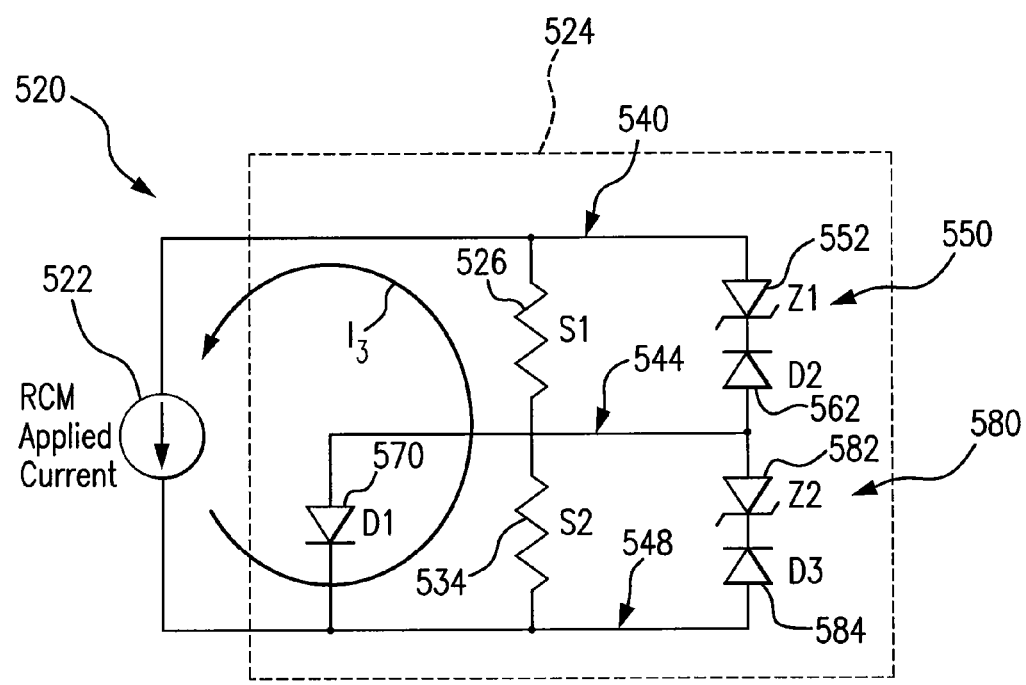
FIG. 7 is a schematic showing the actuation system shown in FIG. 5 but now with the duplex firing initiator shown in accordance with yet another aspect of the invention.

FIG. 5-7 schematically show an actuation system in accordance with another embodiment of the invention and generally designated by the reference numeral 520. The actuation system 520 includes a Restraint Control Module (RCM) 522 electrically connected to a duplex firing initiator in accordance with one aspect of the invention and generally designated by the reference numeral 524. The duplex firing initiator 524 utilizes both rectifier and zener diodes to provide contingencies in situations where either one initiator or squib or the other becomes an open circuit or otherwise "goes open" after deployment.

The RCM 522 can conduct current in a forward polarity and a reverse polarity. In the actuation system 520 with current conducted in a forward polarity, the current is conduct from a first node, generally designated 540, to a second node, generally designated 544, to a third node, generally designated 548. In the actuation system 520 with current conducted in the reverse polarity, the current is conducted from the third node 548 to the second node 544 to the first node 540.

In the actuation system 520, a primary initiator 526 is connected in parallel to a first zener diode/diode pair 550 disposed between the first node 540 and the second node 544. The zener diode/diode pair 550 includes a zener diode 552 connected in series with a diode 562. A secondary initiator 534 is connected in parallel with a second diode 570 between the second node 544 and the third node 548.

More specifically, the zener diode/diode pair 550 has an anode 553 of the zener diode 552 connected to the first node 540, a cathode 554 of the zener diode 552 connected to a cathode 564 of the diode. 562, and an anode 566 of the diode 562 connected to the second node 544.

The actuation system 520 also includes a second zener diode/diode pair 580 connected in parallel with the secondary initiator 530 and the second diode 570, between the second node 544 and the third node 548.

The second zener diode/diode pair 580 includes a second zener diode 582 connected in series with a third diode 584, wherein a cathode 586 of the second zener diode 582 connects with a cathode 588 of the third diode 584.

Referring to FIG. 5, if only the actuation or deployment of the primary initiator or squib 526 is desired, current would be provided by the RCM 522 in a positive bias. Current ($I_1$) would flow through the primary initiator or squib 526 and then routed via the diode 570, e.g., a rectifier diode, to the negative terminal.

Now referring to FIG. 6, if it were desired to then function the secondary initiator or squib 534, current would be applied in a reverse bias through the secondary initiator or squib 534 and routed to the negative terminal via the diode 562. e.g., a rectifier diode, in series with the zener diode 552, the zener diode voltage values being selected in such a way to influence the current flow through this path.

Turning to FIG. 7, if serial firing of the primary and the secondary initiators is preferred, the current flow ($I_3$) could be reverse biased such that it flows through the primary initiator or squib 526 and the secondary initiator or squib 534 in series. If one squib were to go to an open state before the second squib function, one of the zener diodes (552 or 582) could be used to assure current flow parallel with the open path (e.g., resulting from either the primary initiator or squib 526 or the secondary initiator or squib 534).

Figure 8:
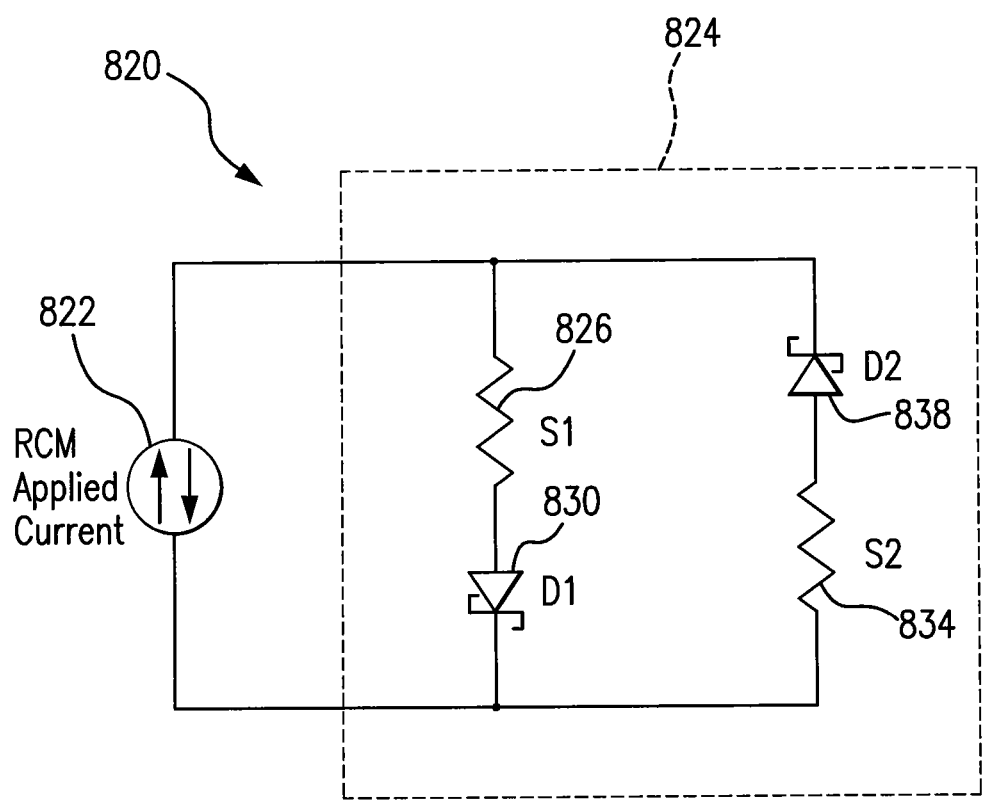
FIG. 8 is a schematic showing an actuation system including a duplex firing initiator in accordance with another embodiment of the invention.

Turning now to FIG. 8, there is illustrated an actuation system in accordance with another embodiment of the invention and generally designated by the reference numeral 820. The actuation system 820 includes a Restraint Control Module (RCM) 822 electrically connected to a duplex firing initiator generally designated by the reference numeral 824.

The actuation system 820 and the duplex firing initiator 824 are somewhat similar to the actuation system 320 and duplex firing initiator 324, shown and discussed above with reference to FIG. 3. For example, the duplex firing initiator 824 includes a primary initiator 826, a first diode 830, a secondary initiator 834 and a second diode 838. In the duplex firing initiator 824, however, the first and second diodes 830 and 838 are preferably Schottky type diodes. Further, there is a slight rearrangement of the primary initiator 826 and the first diode 830. This arrangement addresses a potential failure mode that results from the functioning of the primary initiator 826.

Figure 9:
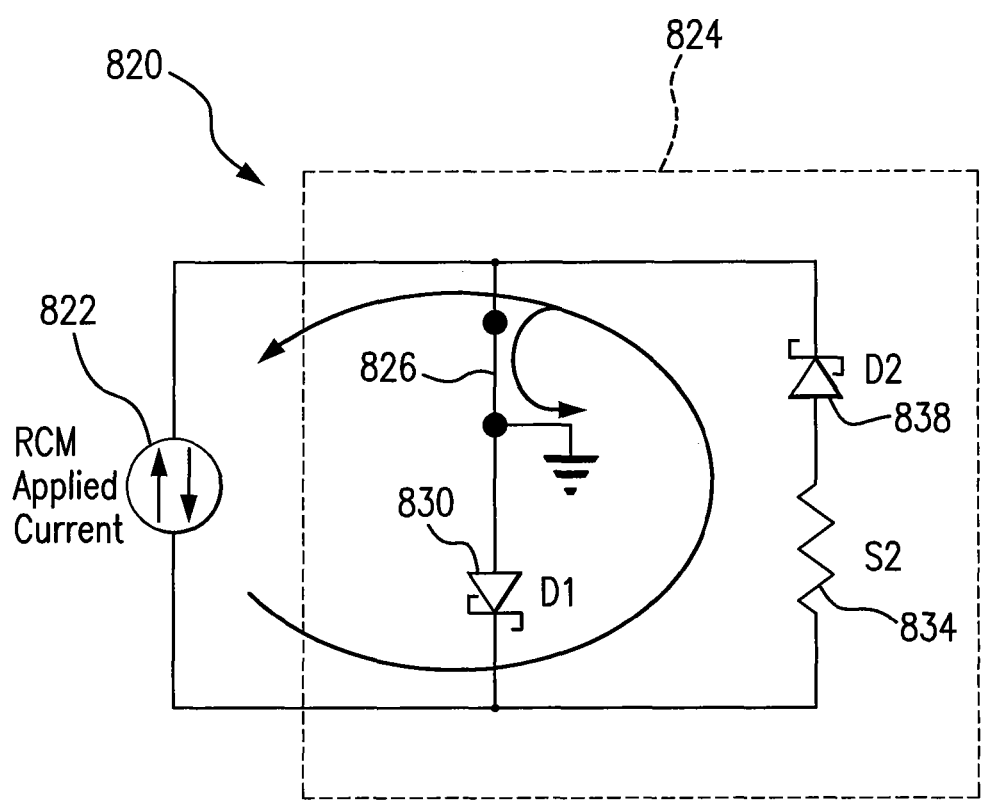
FIG. 9 is a schematic showing the actuation system shown in FIG. 8 but now with the duplex firing initiator shown in accordance with another aspect of the invention.

FIG. 9 illustrates how the actuation system 820 addresses such a potential failure mode where the functioning of the primary initiator 826 is transformed to an electrical short to ground as a consequence of initiation. The occurrence rate of this condition can typically depend on how the initiator is mounted in the higher assembly level inflator and the materials used in the initiator and inflator design.

In the arrangement shown in FIG. 9, the first diode 830 isolates the short to ground from the current path required to function the secondary initiator 834 if or when the situation calls for actuation of the secondary initiator 834. If the first diode were in the previous position (see FIG. 3), relative to the primary initiator, the current intended for secondary initiation would take a direct path to ground, bypassing the secondary initiator. The arrangement shown in FIGS. 8 and 9 eliminates this potential failure. That is, the specific arrangement of initiators and diodes shown in FIG. 8 advantageously offers a solution to the primary side post-initiation short to ground scenario, where the primary side diode isolates the ground path in order for the secondary side initiation to still occur as appropriately demanded by the RCM.

As mentioned above, the circuit shown in FIG. 8 utilizes Schottky diodes. Schottky diodes are different than a standard rectifier diode in that Schottky diodes require a significantly lower threshold voltage (approximately 0.2V instead of 0.7V) in order to turn on and conduct current. This attribute can prove particularly beneficial when considering a protocol for checking the integrity of the circuit such as in the case of in-vehicle diagnostic testing.

Figure 10:
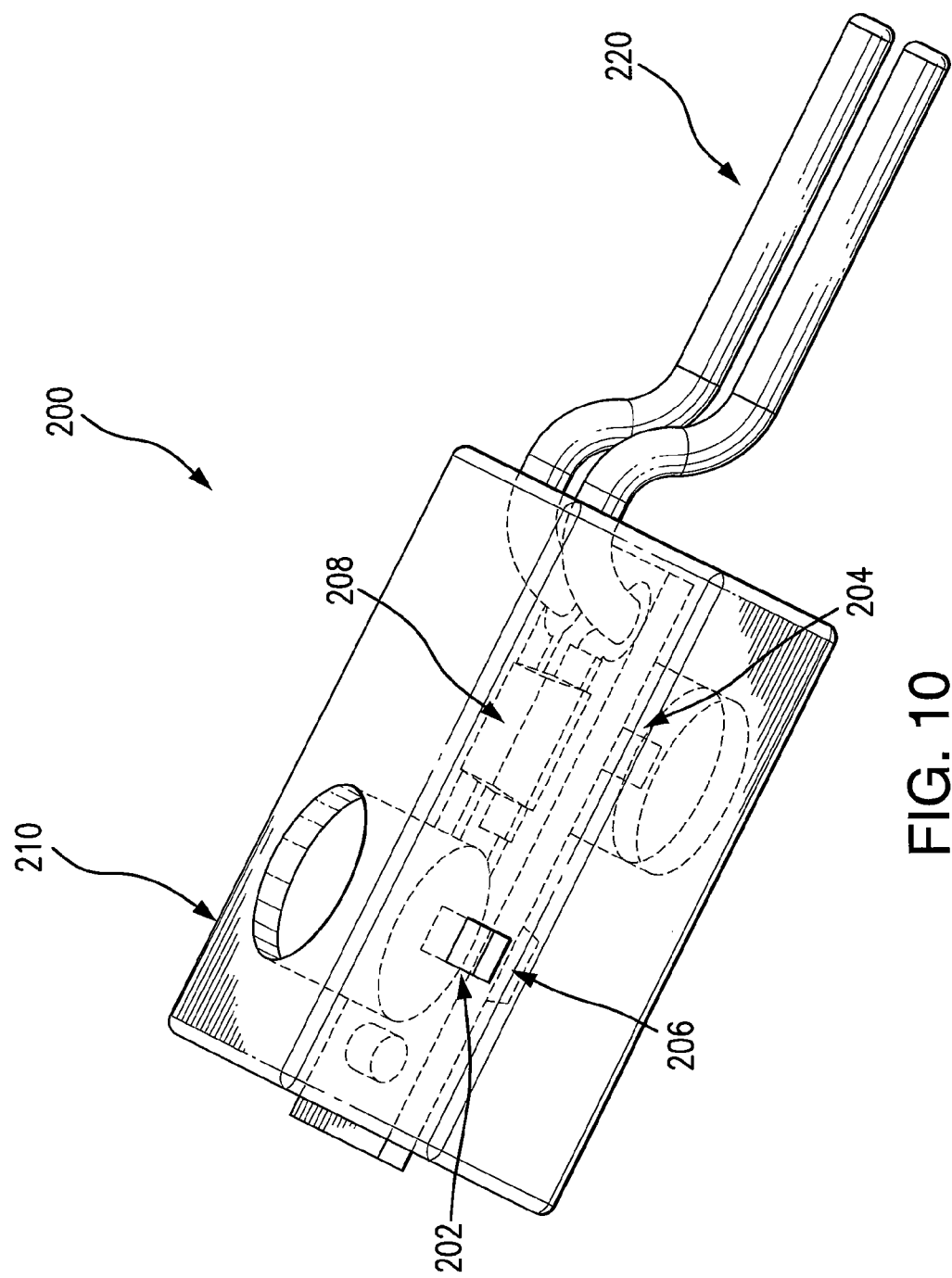
FIG. 10 is a perspective view of a duplex firing initiator in accordance with one aspect of the invention.

FIG. 10 is a perspective view of a duplex firing initiator 200 in accordance with one aspect of the invention.

The duplex firing initiator 200 includes primary and secondary stage initiators, 202 and 204, and first and second diodes, 206 and 208, that may be injection molded into a common housing 210. The duplex firing initiator 200 is shown as having two bent connecting pins 220. Those skilled in the art and guided by the teachings herein provided will appreciate that the broader practice of the invention is not necessarily so limited. For example, if desired or required for a particular application, straight connecting pins can alternatively be employed. Further while the duplex firing initiator 200 shows the initiators 202 and 204 having opposite directed discharges, with the initiators being offset from one another, again the broader practice of the invention is not necessarily so limited. For example, if desired or required for a particular application, a suitable duplex firing initiator may contain or include primary and secondary initiators that discharge in the same general direction or in which the initiators are directly opposed to one another rather than offset.

While the invention has been described above making specific reference to duplex firing initiators that contain or include both a primary and a secondary initiator, it is to be understood that this also encompasses and includes Dual-Stage initiators such as may find application in Dual Stage Inflators, for example.

Those skilled in the art and guided by the teachings herein provided will appreciate that the "Duplex Firing" approach herein described (e.g., such as defined as a system where a signal can flow in both directions between two connections) helps address at least some of the above-described problems such as by reducing the number of RCM output pins, individual wiring loops, connectors and initiator input pins for dual-stage inflator systems by half Employing the use of diodes in deployment circuitry in conjunction with RCM deployment driver architecture specific to polarity reversal, a single, dedicated pair of wires can then signal the firing of two separate stages within an inflator.

"Duplex-Firing" arrangements such as herein provided and described can provide or offer various advantages. For example, by packaging both initiators in a single component embodiment, i.e., in an injection molded body, the size of a first and second stage initiator arrangement in accordance with the invention can be significantly smaller than a traditional arrangement using two separate initiators and connector pockets. Further, only a single two or three pin connection is required to direct the RCM signal to both initiators or squibs. This offers space savings for the inflator which leads to an opportunity to also reduce weight. Still further, fewer required connections to the inflator can mean less dedicated circuitry within the RCM including firing circuits and connector block pin-outs. This can also increase the functionality of the RCM in terms of the number of devices the same package size could interface with, i.e., the same number of pin-outs would have the capability to function more devices. Also, the use of a single connector socket would eliminate one of the connectors and associated firing loop or wiring to the RCM, thereby reducing the cost and weight of the system.

Application of the duplex firing approach also creates an opportunity to retrofit current vehicle platforms with an RCM and smart inflator equipped with duplex-firing capability without requiring changes to be made in the existing wiring to existing single-stage restraint devices. Since the duplex-firing concept includes polarity reversal in association with built-in rectifying diodes, a single set of wires (firing loop) could be used for two separate firing signals of opposite polarity.

Further, the polarity reversal arrangement employed herein can be utilized to address current RCM pin-out connector limitations. The utilization of such polarity reversal can essentially double the number of firing signals that could be provided to active safety devices using a current connector block pin-out scheme. As such, customers would have expanded functionality of the RCM without growing package size or wiring needs.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A duplex firing initiator for an airbag inflator, the duplex firing initiator comprising:
   both a primary initiator and a secondary initiator for electrical connection to a Restraint Control Module; and
   wherein current is conducted in a forward polarity through the primary initiator to actuate the primary initiator and current is conducted in a reverse polarity through the secondary initiator to actuate at least the secondary initiator.

2. The duplex firing initiator of claim 1 additionally comprising a common housing containing both the primary initiator and the secondary initiator.

3. The duplex firing initiator of claim 2 wherein the primary initiator and the secondary initiator are contained within an injection molded body.

4. The duplex firing initiator of claim 1 wherein:
   a diode and the secondary initiator are connected in a parallel connection;
   the primary initiator is connected in series with the parallel connection of the diode and the secondary initiator; and
   wherein current is conducted in a forward polarity through the diode and the primary initiator to actuate the primary initiator and current is conducted in a reverse polarity through the primary initiator and the secondary initiator to actuate at least the secondary initiator.

5. The duplex firing initiator of claim 4, wherein current is conducted in the reverse polarity through the primary initiator and the secondary initiator to actuate the primary initiator and the secondary initiator in series.

6. The duplex firing initiator of claim 5, wherein the diode comprises a standard rectifier diode.

7. The duplex firing initiator of claim 5, wherein the diode comprises a Schottky diode.

8. The duplex firing initiator of claim 1 wherein:
   the primary initiator is connected in series with a first diode;
   the secondary initiator is connected in series with a second diode, the secondary initiator and the second diode connected in parallel with the primary initiator and the first diode;
   wherein the second diode is reverse biased compared to the first diode and
   wherein current is conducted in a forward polarity through the first diode to fire the primary initiator and current is conducted in a reverse polarity to fire the secondary initiator.

9. The duplex firing initiator of claim 8, wherein at least one of the first diode and the second diode comprises a standard rectifier diode.

10. The duplex firing initiator of claim 8, wherein at least one of the first diode and the second diode comprises a Schottky diode.

11. The duplex firing initiator of claim 10, wherein the first diode and the second diode each comprises a Schottky diode.

12. The duplex firing initiator of claim 1 wherein:
   the primary initiator is connected in parallel to a zener diode/diode pair disposed between a first node and a second node, wherein the zener diode/diode pair comprises a zener diode connected in series with a diode;
   the secondary initiator is connected in parallel with a second diode between the second node and a third node; and
   wherein current is conducted in the forward polarity from the first node to the second node to the third node and in the reverse polarity from the third node to the second node to the first node and wherein current is conducted in the forward polarity through the primary initiator and the second diode to actuate the primary initiator and in the reverse polarity through the secondary initiator and at least one of the primary initiator and the zener diode/diode pair to actuate at least the secondary initiator.

13. The duplex firing initiator of claim 12, wherein the zener diode/diode pair comprises an anode of the zener diode connected to the first node, a cathode of the zener diode connected to a cathode of the diode, and an anode of the diode connected to the second node.

14. The duplex firing initiator of claim 12 further comprising:
a second zener diode/diode pair connected in parallel with the secondary initiator and the second diode, the second zener diode/diode pair comprises a second zener diode connected in series with a third diode, wherein a cathode of the second zener diode connects with a cathode of the third diode.

15. A duplex actuation system for an inflatable restraint, the system comprising:
a duplex firing initiator of claim 1 and
a Restraint Control Module in operative electrical connection with the duplex firing initiator.

16. A duplex firing initiator for an airbag inflator, the duplex firing initiator comprising:
both a primary initiator and a secondary initiator for electrical connection to a Restraint Control Module; wherein:
the primary initiator is connected in series with a first diode;
the secondary initiator is connected in series with a second diode, the secondary initiator and the second diode connected in parallel with the primary initiator and the first diode;
wherein the second diode is reverse biased compared to the first diode;
wherein current is conducted in a forward polarity through the first diode to fire the primary initiator and current is conducted in a reverse polarity to fire the secondary initiator; and
wherein at least one of the first diode and the second diode comprises a Schottky diode.

17. The duplex firing initiator of claim 16, wherein the first diode and the second diode each comprises a Schottky diode.

* * * * *